US008206136B2

(12) United States Patent
Brouwer et al.

(10) Patent No.: US 8,206,136 B2
(45) Date of Patent: Jun. 26, 2012

(54) SYSTEM OF DIAPHRAGM AND CO-ACTING PART

(75) Inventors: Markus Franciscus Brouwer, Heesch (NL); Jeroen Daniel De Regt, Oss (NL)

(73) Assignee: MeadWestvaco Calmar Netherlands B.V., Albert Einsteinweg (NL)

( * ) Notice: Subject to any disclaimer, the term of this patent is extended or adjusted under 35 U.S.C. 154(b) by 929 days.

(21) Appl. No.: 11/663,171

(22) PCT Filed: Sep. 15, 2005

(86) PCT No.: PCT/NL2005/000673
§ 371 (c)(1), (2), (4) Date: Sep. 7, 2007

(87) PCT Pub. No.: WO2006/031110
PCT Pub. Date: Mar. 26, 2006

(65) Prior Publication Data

US 2009/0110576 A1 Apr. 30, 2009

(30) Foreign Application Priority Data

Sep. 16, 2004 (NL) ..................................... 1027061
Apr. 8, 2005 (NL) ..................................... 1028730

(51) Int. Cl.
*F04B 43/00* (2006.01)
*F16J 3/00* (2006.01)
*B65D 37/00* (2006.01)

(52) U.S. Cl. .............. 417/480; 92/98 D; 92/99; 222/214
(58) Field of Classification Search .................. 417/480; 92/98 D, 99; 222/207, 214
See application file for complete search history.

(56) References Cited

U.S. PATENT DOCUMENTS 4,347,953 A 9/1982 Bauer
5,238,156 A * 8/1993 Andris .......................... 222/207
5,476,195 A * 12/1995 Oder et al. .................... 222/207
5,518,147 A 5/1996 Peterson et al.
5,544,789 A * 8/1996 Gillingham .............. 222/153.13
5,897,304 A * 4/1999 Kaneko .......................... 417/552
6,406,207 B1 6/2002 Wiegner et al.
6,547,106 B2 4/2003 Bonningue
6,805,267 B2 10/2004 Bougamont

FOREIGN PATENT DOCUMENTS

WO WO2004/004921 A 1/2004

* cited by examiner

*Primary Examiner* — Charles Freay
(74) *Attorney, Agent, or Firm* — MeadWestvaco Intellectual Property Group

(57) ABSTRACT

The invention relates to a system of bellows and co-acting part, including a co-acting part which comprises a stiff outer wall, and a bellows co-acting therewith which comprises a flexible wall of a predetermined shape and thickness, wherein the flexible wall of the bellows is movable along the stiff outer wall of the co-acting part, wherein the bellows includes at least two separately deformable flexible wall parts' which each co-act with a different part of the stiff outer wall of the co-acting part.

10 Claims, 8 Drawing Sheets

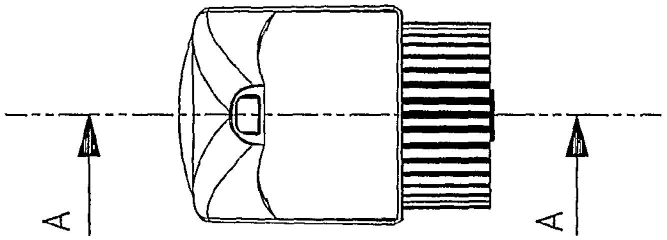
FIG. 2A
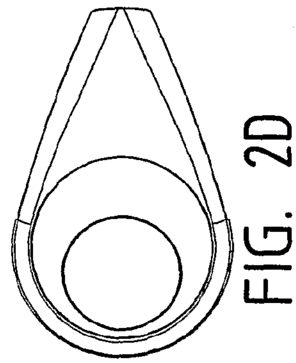
FIG. 2D
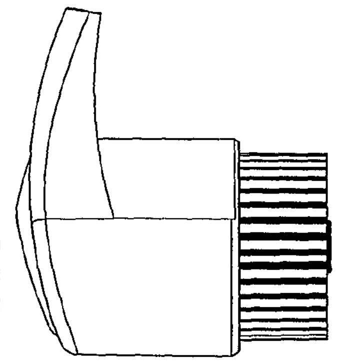
FIG. 2C
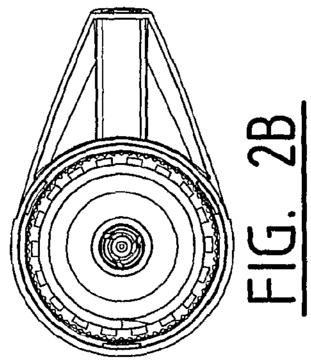
FIG. 2B
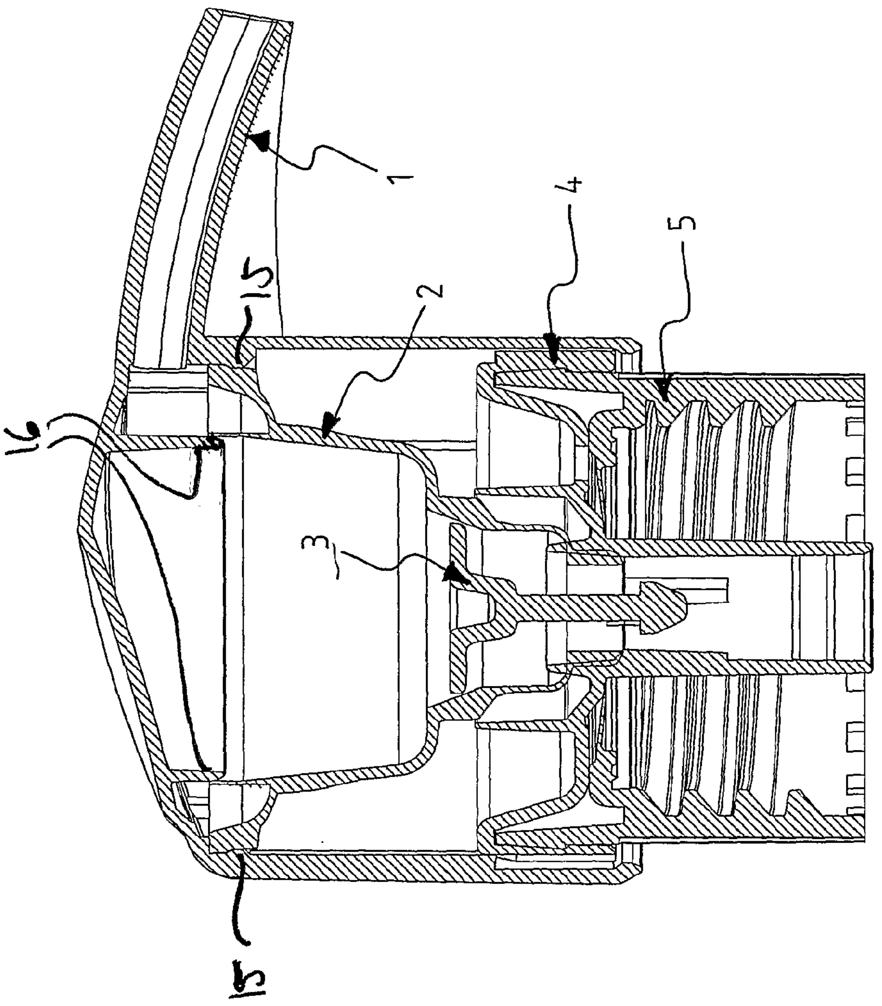
FIG. 2A-A

SYSTEM OF DIAPHRAGM AND CO-ACTING PART

The present invention relates to a system of a bellows and a co-acting part as according to claim 1. The invention also relates to a pump provided with such a system.

A pump with a bellows is known from U.S. Pat. No. 4,347,953. Such a pump is also known from JP 10-236503 A.

Reference is further made to WO 2004/004921 A1. The content of this publication is incorporated by way of reference into this application.

A pump is constructed from a number of parts, for instance a housing, a cap, a bellows and a part co-acting with a bellows. Such a bellows has a spring force which, after a determined compression has been passed, is different from the initial value, whereby the further compression is assisted. A flexible wall of the bellows moves in the free space during compression. The application of this pump is limited to dispensing a predetermined amount of foam, liquid or gas.

A first problem of the known pumps is that they are not provided with a liquid barrier. The known pumps with bellows closure are further not suitable for use on a bottle.

The present invention has for its object to provide an improved system of the above stated type.

The invention therefore provides a system of bellows and co-acting part, comprising a co-acting part, which comprises a stiff outer wall, and a bellows part co-acting therewith which comprises a flexible wall of a predetermined shape and thickness, wherein the flexible wall of the bellows is movable along the stiff outer wall of the co-acting part, and wherein the bellows comprises at least two separately deformable flexible wall parts which each co-act with another part of the stiff outer wall of the co-acting part.

The invention will be further described with reference to the accompanying drawings. In the drawings:

FIGS. 2A-2D show respectively a front view, a bottom view, a side view, and a top view of a pump according to an embodiment of the invention;

Figure 3A:
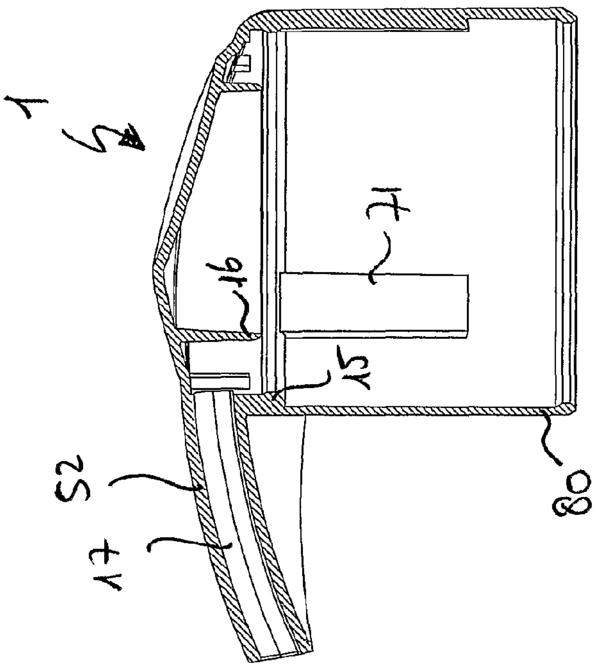
Figure 3A:
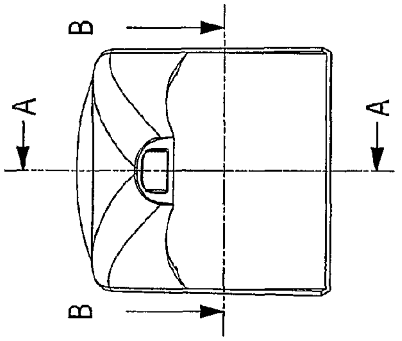
Figure 3C:
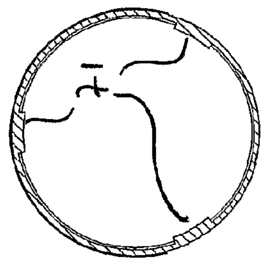
Figure 3C:
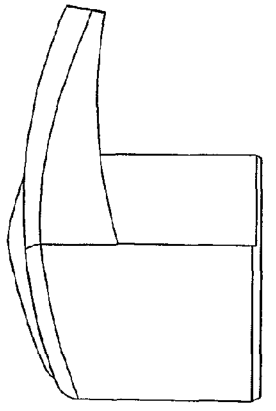
Figure 3D:
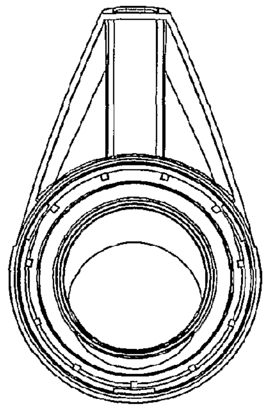
Figure 4A:
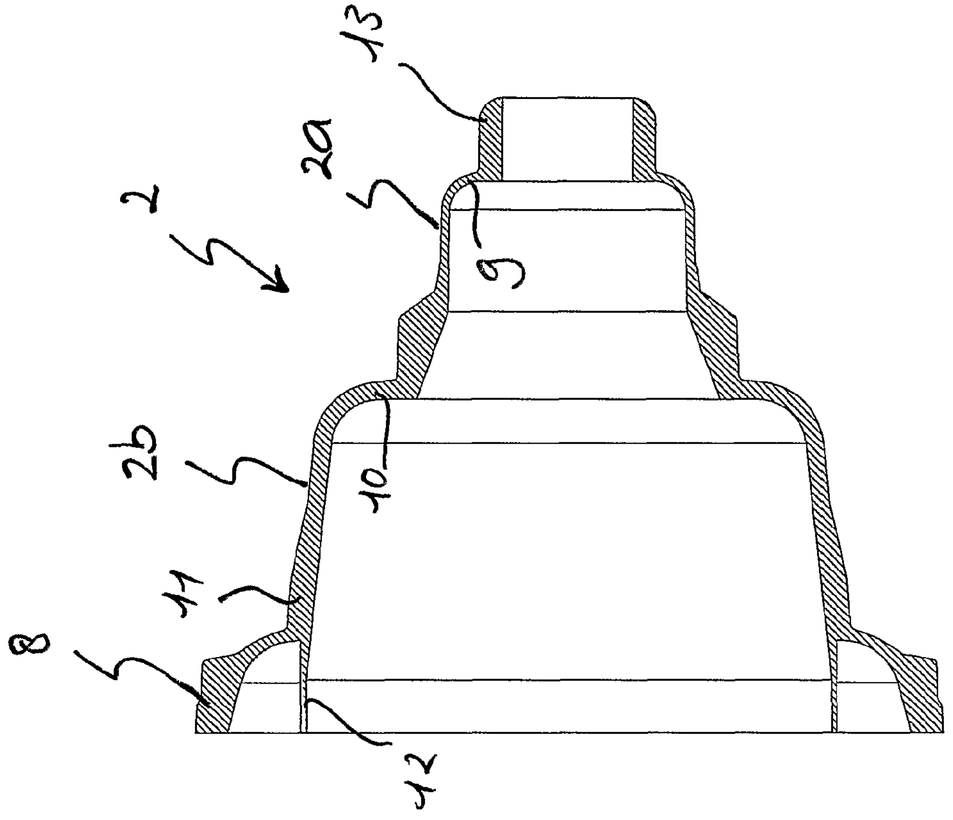
Figure 4A:
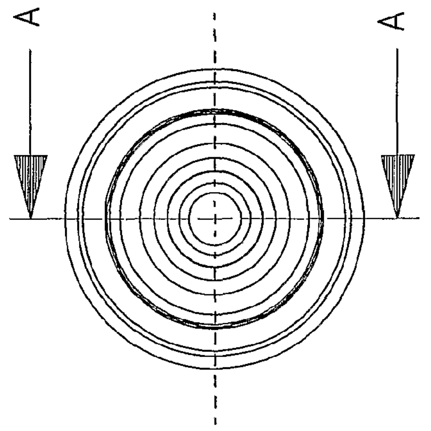
Figure 4B:
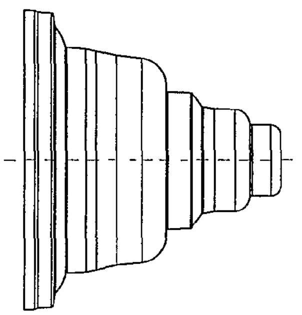
Figure 5B:
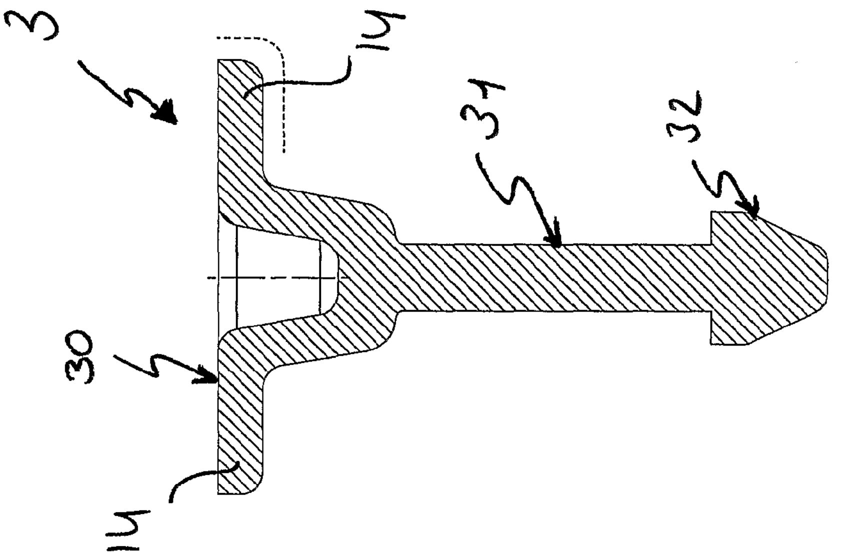
Figure 5B:
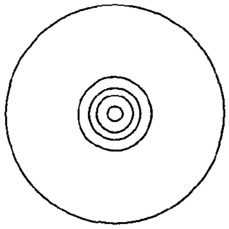
Figure 5A:
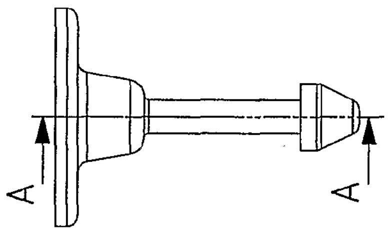
Figure 5C:
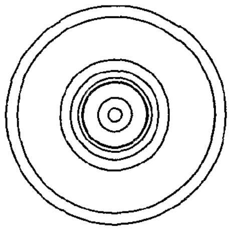
Figure 6A:
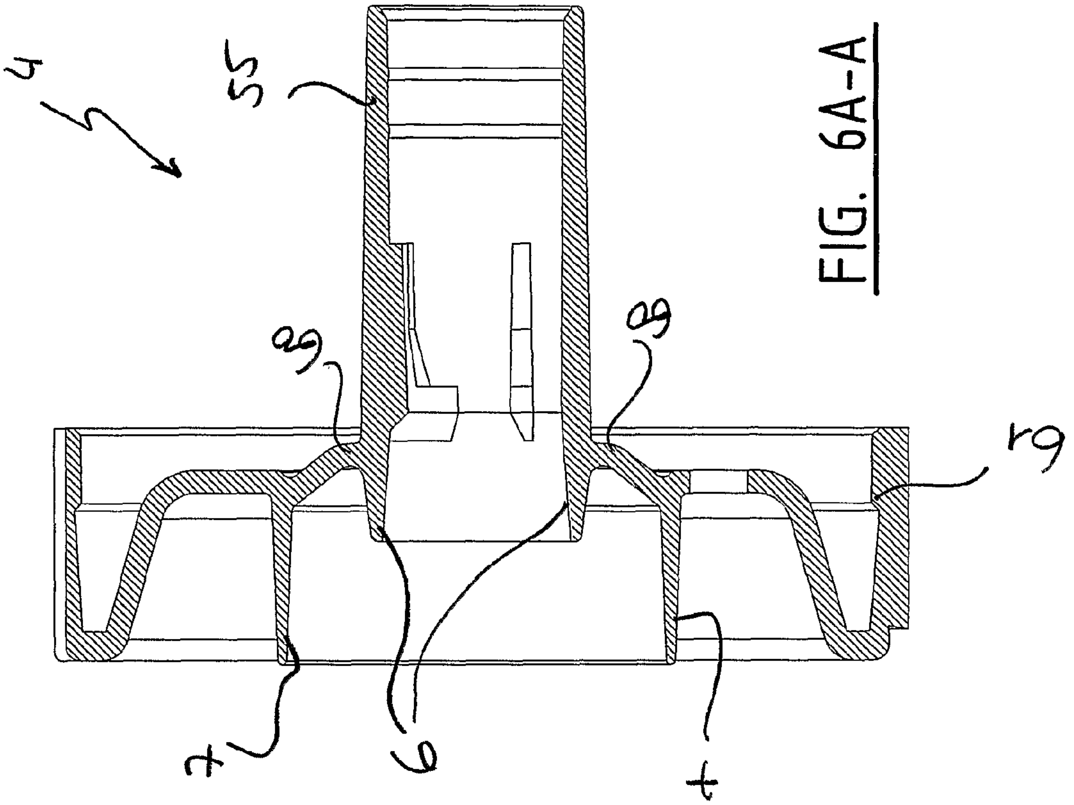
Figure 6A:
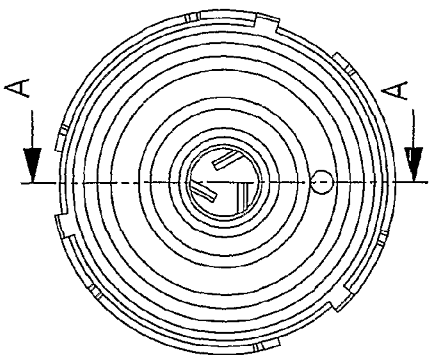
Figure 6B:
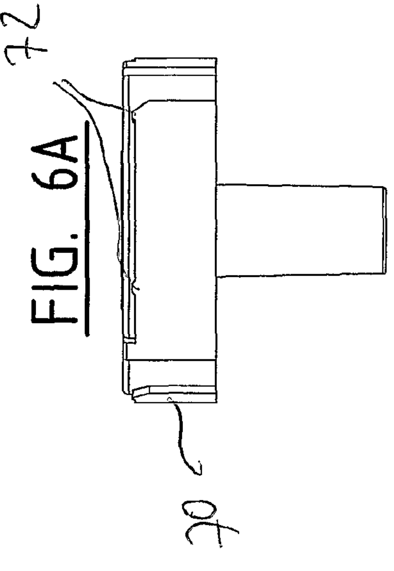
Figures 7A, 7B, 7C, 7D, 7E:
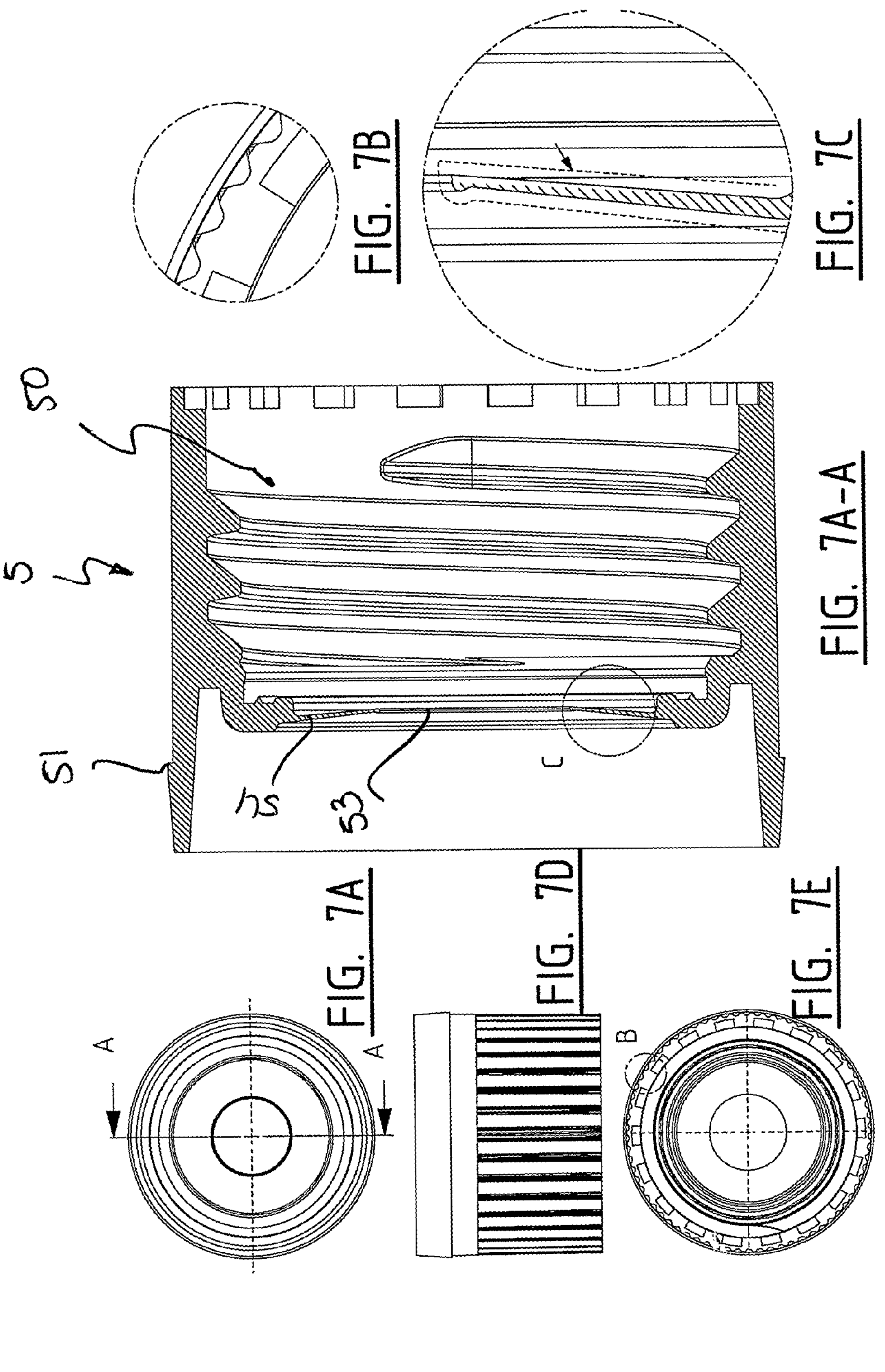

FIG. 2A-A shows a cross-section along A-A in FIG. 2A;

FIGS. 3A, 3C and 3D show respectively a front view, side view and bottom view of a nozzle;

FIG. 3A-A shows a cross-section along A-A in FIG. 3A;

FIG. 3B-B shows a cross-section along B-B in FIG. 3A;

FIGS. 4A and 4B show respectively a top view and side view of a bellows;

FIG. 4A-A shows a cross-section along A-A in FIG. 4A;

FIGS. 5A-5C show respectively a front view, a top view and a bottom view of a valve part;

FIG. 5A-A shows a cross-section along A-A in FIG. 5A;

FIGS. 6A and 6B show respectively a top view and a front view of a co-acting part;

FIG 6A-A shows a cross-section along A-A in FIG. 6A;

FIGS. 7A, 7D and 7E show respectively a top view, a front view and a bottom view of a closing part;

FIGS. 7B and 7C show details as designated respectively with B in FIG. 7E and C in FIG. 7A-A, and FIG. 7A-A shows a cross-section along A-A in FIG. 7A.

A bellows 2 provided with a flexible wall of a predetermined shape and thickness can preferably be formed by injection-moulding. The flexible wall, in particular the thickness, is one of the parameters that can be used to change the force with which the bellows can deform, and whereby the operation of the pump can be influenced.

According to the invention bellows 2 can be provided with wall parts of differing thickness. According to one embodiment in particular, bellows 2 has a substantially conical form, preferably consisting of a number of substantially horizontal and vertical wall parts whereby a preferably stepped tapering cone is obtained. The respective wall parts of bellows 2 can be of differing thickness according to the invention. Bellows 2 can have in particular a bellows function operating in two stages. The bellows is provided for this purpose with two parts which can unroll independently of each other. The two unrolling parts or bellows parts 2*a*, 2*b* are arranged above each other in the conical form. The two bellows parts 2*a*, 2*b* can co-act with protrusions 6, 7 of a co-acting part 4. Bellows parts 2*a*, 2*b* unroll when they come up against protrusions 6, 7 of co-acting part 4. The different bellows parts 2*a*, 2*b* will have two different peripheral dimensions. Different protrusions 6, 7 of co-acting part 4 can hereby co-act with different components of bellows 2. The different bellows parts 2*a*, 2*b* will operate independently of each other.

Bellows 2 can have different cross-sections, including square or rectangular, although bellows 2 is preferably of cylindrical cross-section. The co-acting part is formed in corresponding manner, and preferably has a cylindrical form.

It is preferably the substantially vertical wall parts of bellows 2 which will unroll during functioning of bellows 2. The wall thickness of the vertical parts can differ. In the embodiment as conical form the bellows 2 has a base 8. The side walls protrude from base 8 and are tapered, optionally in stepped manner. Under the side walls are created a number of support edges 9, 10 around bellows 2 formed by the substantially horizontal parts.

The bellows according to the invention functions in that it is moved against a co-acting part 4. Co-acting part 4 preferably comprises a protrusion 6, 7 formed similarly to bellows 2 or a portion running obliquely downward against which the bellows 2 can move with the unrolling wall.

In one embodiment the co-acting part 4 has one protrusion to allow functioning of the respective parts 2*a*, 2*b* of bellows 2. However, co-acting part 4 preferably has two or more protrusions on which bellows 2 will support and along which the unrolling parts can move. In an embodiment the co-acting part has two circular protrusions 6, 7 of the same form.

In an embodiment the bellows 2 has two support edges 9, 10 against which protrusions 6, 7 of co-acting part 4 will support during operation. These edges 9, 10 are situated on the outer side of bellows 2. Support-edge 10 for bellows part 2*b* with the greater resistance preferably has a larger periphery than support edge 9 for bellows part 2*a* with the lesser resistance.

In one embodiment bellows 2 has close to support edge 10 for the heavier bellows part 2*b* an inner wall part 11 which tapers substantially in accordance with the cross-sectional conical form of bellows 2. This wall part 11 is formed such that a valve 12, which will be described in more detail below, can support thereon and can be accommodated in the bellows. The inclining side walls of bellows 2 taper in the direction of the top 13 of conical bellows 2 and have a dimension such that the legs 14 of a valve part 3 can be received therebetween and can lie close-fittingly thereon whereby the opening in bellows 2 is closed.

Bellows 2 preferably comprises close to the open large outer end of the conical form a base 8 which can support against protrusions 15 in for instance the nozzle 1. The base 8 is thickened.

Arranged close to this base 8 is a valve 12 which co-acts with a protrusion 16 of nozzle 1. Valve 12 is arranged as outlet for the volume received in bellows 2. Valve 12 closes the access from outside. Formed between valve 12 and base 8 is an open space 18 which extends in the conical form around the large open end of bellows 2. Base 8 can co-act with a protrusion in co-acting part 4, whereby this chamber 18 is slightly compressed when bellows 2 functions. Compressing of this chamber 18 has the result that, when the bellows 2 is released from FIG. 1C to FIG. 1D in a return stroke, there occurs a so-called suck-back effect of fluid that is being carried to the outside through nozzle 1. Chamber 18, which is in communication with outlet 17 via the nozzle, will take on its original volume, this being greater than the compressed volume during operation. A part of the fluid is hereby sucked back into this chamber 18, whereby droplets that are formed on nozzle 1 are sucked back.

In another embodiment the base 8 is guided along nozzle 1, wherein the base is pressed inward whereby the space 18 between valve 12 and base 8 is made smaller. During the stroke in which bellows 2 is compressed this space 18 is reduced in size, while this space 18 is enlarged when bellows 2 is released. The suck-back function is hereby also achieved. The operation of valve 12 and co-action of nozzle 1 is further shown in the drawings.

Bellows 2 according to the invention preferably co-operates with a valve part 3. An embodiment for the valve part according to the invention is a valve part in the form of a base 30, substantially a round shape, wherein an elongate part 31 extends from base 30 close to the centre, which part is preferably provided on an outer end with a hooking part 32, in particular in the form of an outward pointing protrusion which can co-act with an inward directed protrusion 33 of the co-acting part such that this hook-like outer end 32 can be hooked thereunder (see FIG. 5A-5C and FIG. 5A-A).

The valve part 3 can be accommodated in bellows 2 and will herein lie with its base 30 against the inner side walls of bellows 2. The diameter of base 30 of valve part 3 substantially corresponds to the diameter of the side walls of bellows 2 close to one of the support edges 10 thereof.

Valve part 3 and bellows 2 are formed such that the part 31 extending from base 30 and provided with the hooking outer end 32 of valve part 3 is longer than the distance between the side walls of bellows 2 on which the base supports and the open end of bellows 2. The hooking outer end 32 hereby protrudes beyond the open end of bellows 2. The hooking outer end 32 can hereby co-act with components of co-acting part 4 with which bellows 2 also co-acts. Hooking part 32 protrudes beyond bellows 2 when valve part 3 is received in bellows 2.

Valve part 3 can close the opening of the bellows. A liquid barrier is hereby obtained.

In addition, the invention relates to a pump comprising a system as specified herein arranged or to be arranged on a container, in particular a bottle. The pump preferably further comprises a closing part 5 which can be fixed onto the outer end of the container or bottle, a base or co-acting part 4 which is coupled to closing part 5, a bellows 2, a valve part 3 and a nozzle 1 for dispensing the fluid for pumping. The respective parts will be described below. The pump can be covered with a cap.

Closing part 5 preferably comprises a receiving space 50 for an outer end with screw thread, wherein receiving space 50 is provided with a co-acting screw thread. A sealing ring can be used to have the open end of the container and closing part 5 fit onto each other so there is no chance of leakage. Closing part 5 is arranged between the edge of the open end of the container and co-acting part 4.

Closing part 5 (see FIG. 2A-A, FIG. 7A-D and FIG. 7A-A) is provided with one or a number of protrusions 51 onto which a base part or co-acting part 4 of the pump can engage. The engagement is such that base part 4 can be rotated relative to closing part 5. The protrusion 51 which is engaged is then in particular circular. Positioning of the pump, and in particular nozzle 1, relative to the bottle can hereby take place, particularly irrespective of the form of the bottle and/or the form of the screw thread. Nozzle 1 can particularly be rotated such that the spout 52 thereof protrudes on a desired side. Positioning of spout 52 can be especially important during transport of the container provided with the pump. Favourable positioning results in space-saving.

Closing part 5 is preferably also provided with an opening 53 in which at least a part of the base part or co-acting part 4 can be received so that this part gains access to the interior of the bottle coupled to closing part 5. The closing part 5 arranged over the outer end of the container is particularly provided with valve parts 54 which protrude resiliently inward and which come to lie against corresponding parts of co-acting part 4 when this latter is arranged on closing part 5.

The co-acting part or base part 4 (see FIG. 2A-A; FIG. 6A-6B and FIG. 6A-A) preferably comprises a neck part 55 for arranging in the opening of a container, in particular a bottle, along which part suction of the liquid out of the container is possible. Neck part 55 is provided on the inside with a number of projections 33 which protrude inward. Projections 33 are preferably L-shaped protrusions which are arranged on the inner side wall of neck part 55 and which protrude inward, but which are preferably not directed toward the centre of neck part 55. In cross-section of neck part 55, with a substantially cylindrical form, the projections 33 extend inward at an angle alongside the centre of this neck part 55. A movement of projections 33 is hereby possible. Projections 33 are somewhat flexible and displaceable in the direction toward the inner side wall of neck part 55, for instance when a larger object is arranged in neck part 55. Owing to their flexibility the extending projections 33 will however move back. With this assembly it is possible to arrange a hooking part 32 beyond projections 33, wherein hooking part 32 engages under projections 33 when these projections 33 are moved back to their starting position. Projections 33 have a substantially (reversed) L-shape. The long side of the L is connected to the inner wall of neck part 55. A hooking part 32, in particular the hooking end of valve part 3, can be positioned under the short leg of the L when the hooking end 32 is arranged beyond these legs.

Neck part 55 of co-acting part 4 is arranged in the outer end of the bottle. It protrudes through an open (upper) end 53 of closing part 5. At this open end 53 a valve part 54 is formed in that the edge around the outer end lies against protrusions 60 of the co-acting part. The connection of co-acting part 4 to closing part 5 has the result that valve parts 54 are tensioned against the corresponding protrusions 60 of co-acting part 4 (see FIG. 2A-A). When an overpressure is present on the outside of the bottle, closing part 5 and/or co-acting part 4, these valve parts 54 can be opened, whereby air can flow into the container. This air replaces in particular the liquid drawn off by the pump.

The base part or co-acting part 4 has a number of extending protrusions 6, 7 on the side remote from the bottle. These protrusions 6, 7 are formed such that they can engage on corresponding parts, in particular support edges 9, 10, of bellows 2. Support edges 9, 10 form substantially horizontal wall parts of bellows 2. Bellows 2 has a substantially narrow tapering form. The narrow tapering outer end of bellows 2 is directed toward the side of base part 4 provided with protrusions 6, 7 and placed thereon. As bellows 2 moves toward base part 4 the side walls of bellows 2 will unroll, whereby the volume on the inside of bellows 2 is decreased.

Base part 4 is particularly provided with a number of such protrusions 6, 7 forming a co-acting part for bellows 2 or bellows parts 2*a*, 2*b*. A stepped function can hereby be obtained for the respective functions of the pump. Particularly obtained hereby are a liquid closure of the bottle and a pumping action for dispensing the fluid received in the bottle.

Figure 1A:
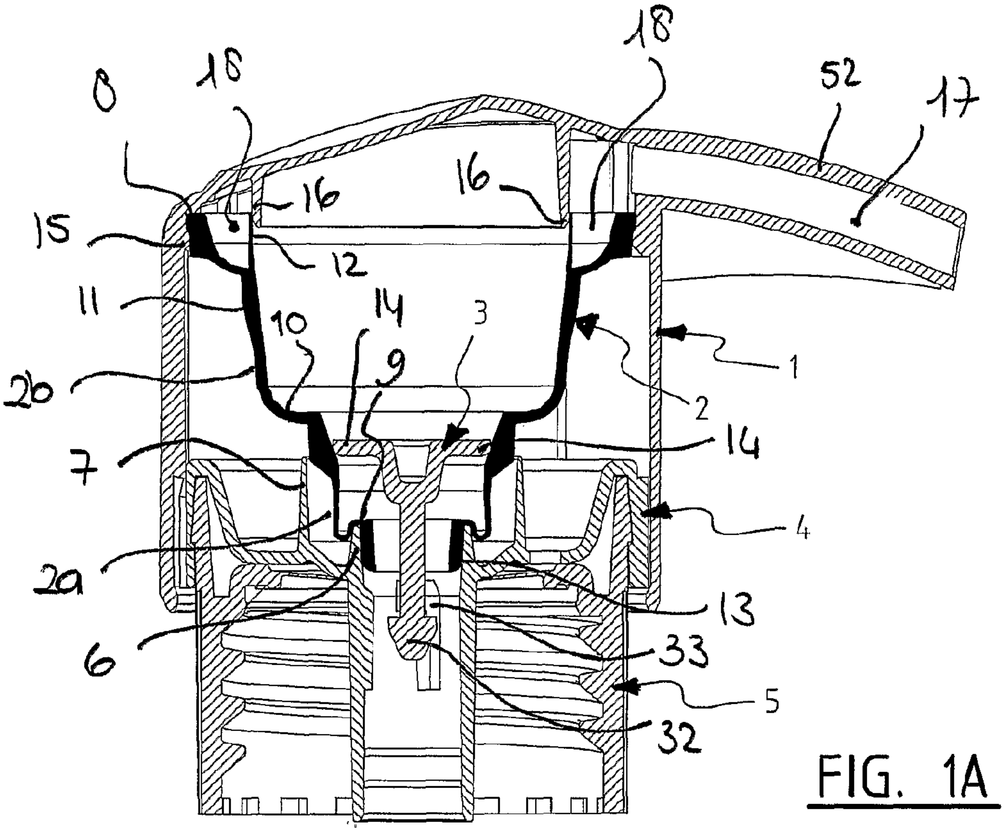
FIGS 1A-1D show cross-sections of a pump according to an embodiment of the invention in respectively a rest position, partly compressed position, compressed-position, and once again the rest position.
Figure 1B:
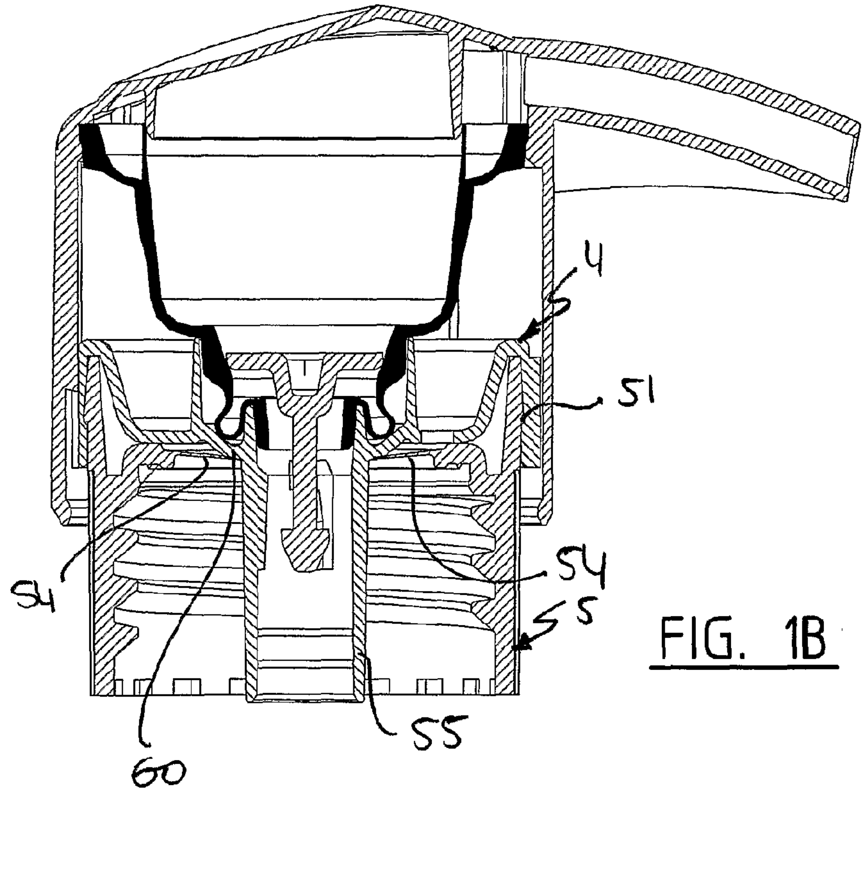
Figure 1C:
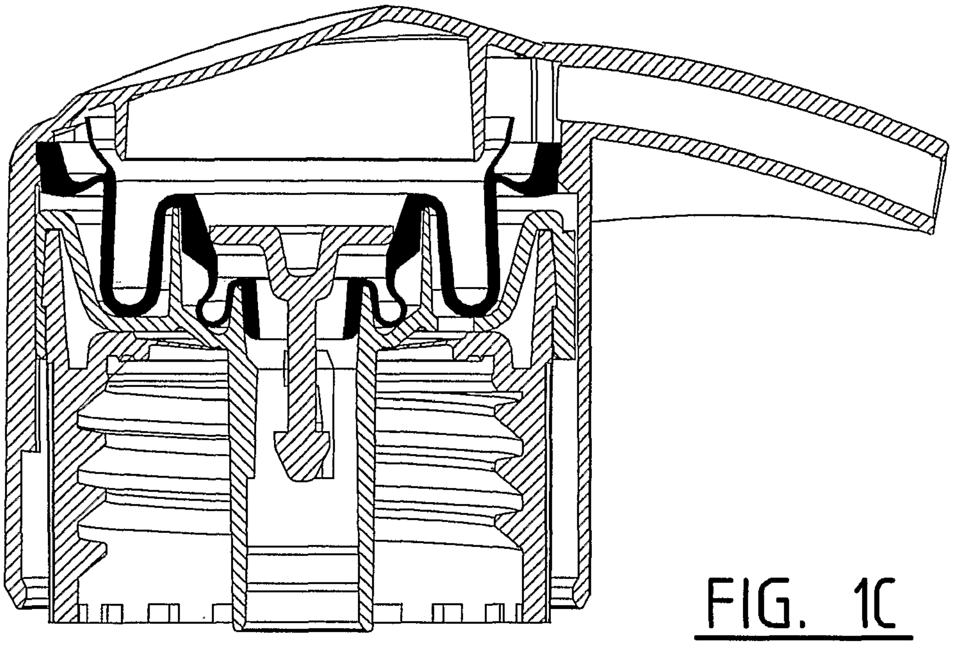
Figure 1D:
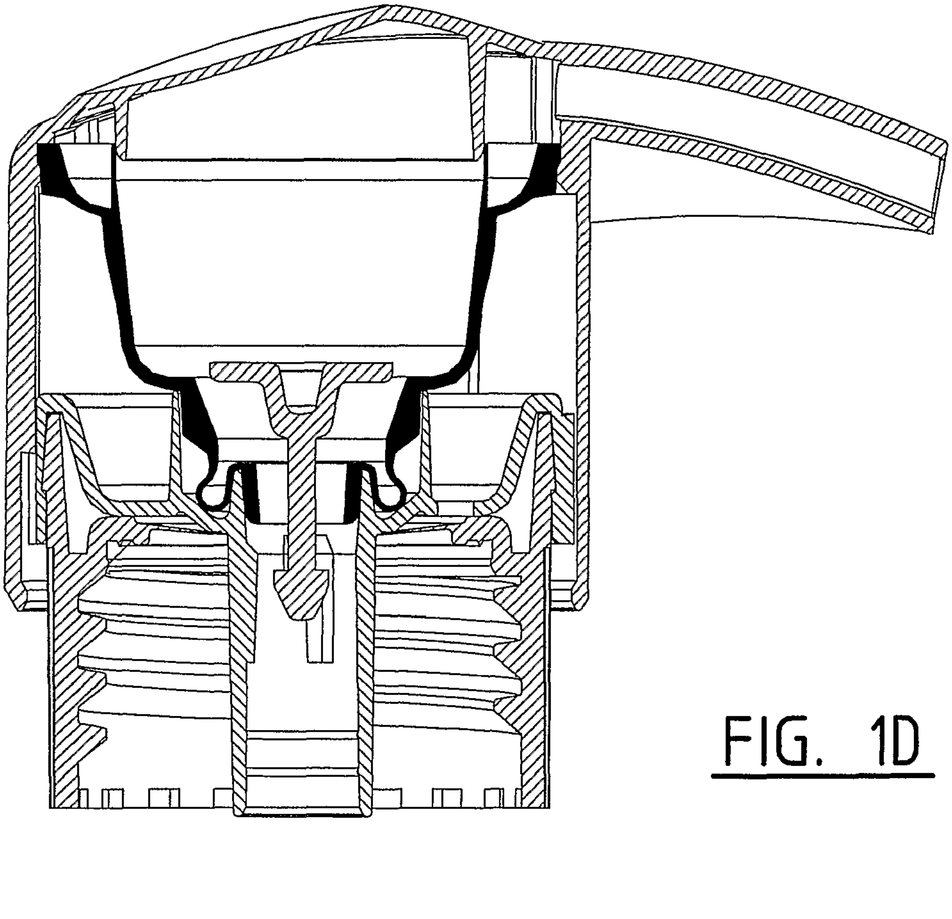

Base part 4 particularly has a protrusion which can co-act with a bellows part formed as the base 8 of bellows 2, whereby a space 18 formed on the inner side of base 8 can be made smaller so as to achieve a so-called suck-back function (see FIG. 1D).

Base part 4 is provided with clamping parts 61 which can co-act with closing part 5, so that base part 4 can engage thereon.

Around the outer periphery thereof base part 4 is provided with a number of grooves 70. These grooves 70 co-act with ribs 71 on the nozzle 1 which can be arranged around this base part 4. When ribs 71 arranged on the inner side of nozzle 1 are aligned with grooves 70 of base part 4, the nozzle 1 can be operated. Groove 70 is also provided with a number of protrusions 72 behind which the associated rib 71 of nozzle 1 can be fixed. Movement relative to base 4 is hereby blocked. The arranging of grooves 70 on the outside of base part 4 makes it possible for a rotation stroke of nozzle 1 relative to base part 4 to result in the blocking. The use of nozzle 1 can hereby be blocked, for instance during transport. This further prevents leakage.

Such grooves 70 can be arranged at a number of positions on the outside of base part 4 and a number of ribs 71 can be arranged in corresponding manner on the inside of nozzle 1.

Nozzle 1 comprises an outer wall 80 which is placed over base part 4 and which is embodied such that it engages over base part 4 and lies on the outer side of closing part 5. Nozzle 1 is movable reciprocally relative to the assembled closing part 5 and base part 4 in a direction substantially in line with the bottle opening.

Nozzle 1 comprises a supporting edge on the inside on which the base part 4 can support. Bellows 2 can be arranged clampingly on the inner side of nozzle 1.

Base part 4 is preferably provided with an opening which is connected in the mounted position to closing part 5, and particularly the chamber formed between base part and closing part 5 is also connected to valve part 3. Air can enter valve part 3 via the opening whereby in the case of underpressure this air can take the place of the pumped-out fluid in the bottle.

The operation of the pump according to the invention will be described below.

First of all the pump is assembled. Closing part 5 is arranged on a bottle outer end, for instance by screwing this closing part 5 onto the bottle outer end. Base part 4 is arranged over this closing part 5, wherein this base part 4 is provided on the side remote from closing part 5 with extending protrusions 6, 7 which will form the co-acting part of a bellows 2 to be arranged. Bellows 2 is placed in a receiving space of nozzle 1, wherein base 8 of bellows 2 supports against a protrusion 15. Arranged in bellows 2 is a valve part 3 which extends with a hooking end 32 out of the spout-like opening of bellows 2. A closing ring can optionally be arranged between closing part 5 and the neck of the bottle. The respective parts are formed and provided with arms which lock together such that removal of the parts after assembly is not necessary without additional tools.

The thus assembled pump consists of five parts. These co-act mutually for the purpose of causing a pumping action in a container onto which this part can be placed, wherein a liquid leakage barrier is also provided.

In assembly of the pump part the bellows 2 is dimensioned such that it supports in tensioned manner on a first edge or protrusion 6 of base part 4. Bellows 2 is deformed in that area, whereby a force is generated which holds nozzle 1 and bellows 2 in the starting position.

Valve part 3 protrudes with a hooking part 32 beyond the inward protruding projections 33 in neck part 55 of base part 4. During assembly of the pump the valve 3 is placed beyond these projections 33 into bellows 2. Valve part 3 is held in position by these projections 33, wherein base 30 of valve 3 supports on the inner side wall of bellows 2. A valve function is hereby obtained which acts as liquid barrier. The mutually adapted dimensions of the stem part 31 of valve 3 in combination with the distance between the underside of projections 33 extending into neck part 55 and the tensioned bellows part 2*a* supporting on co-acting part/protrusion 6 of base part 4 provide for closure of valve 3. When there is an underpressure, for instance during transport of the pump in an aircraft, valve part 3 in combination with bellows 2 and the base part will prevent liquid flowing to the outside. Nor does an overpressure created in the bottle, for instance through squeezing of the bottle, result in leakage.

When the pump is used in the assembled state a pressure is applied to nozzle 1 in a direction wherein the nozzle moves toward the neck of the bottle (see FIG. 1A (starting position) and FIG. 1B (compressed)). First of all the smaller bellows part 2*a* will hereby further deform. The small bellows part 2*a* was already tensioned. This has the result that the distance is reduced between the position where the base 30 of valve part 3 supports on the inner side wall of bellows 2 and the underside of projections 33 under which the valve part 3 hooks. However, valve 3 remains in its closed position because of the pressure exerted by fluid present in the larger bellows part. Valve part 3 now functions as valve part 3 that prevents return back of fluid from the upper/inner part of bellows 2. The hooking part 32 of valve part 3 will protrude further into neck part 55 of base part 4.

With further movement (FIG. 1C) of nozzle 1 and in the direction of base part 4 and closing part 5, a second support edge 10 of bellows part 2*b* will come up against a second protrusion edge 7 or co-acting part of base part 4. Deformation of the first bellows part 2*a*, the smaller bellows part, is hereby stopped. Deformation of the second bellows part 2*b* will take place with further movement of nozzle 1.

Because valve part 3 prevents feedback of fluid from the larger bellows part 2*b*, the fluid will come under pressure when second bellows part 2*b* begins to deform. Via the thin film or valve part 12 close to the larger open end (the base) of bellows 2, the fluid will be able to escape and enter nozzle 1 and leave nozzle 1 via spout 52 (situation shown in FIG. 1C).

Deformation of bellows part 2, and particularly second bellows part 2*b*, continues until nozzle 1 comes up against base part 4.

The space 18 between the base of bellows 2 and the film part 12 functioning as valve is also deformed as nozzle 1 moves further in the direction of base part 4. This space 18 becomes smaller. Particularly obtained here is a third bellows function. This bellows function can be enhanced by having this receiving space come up against a protrusion on base part 4. Further displacement, and thus reduction in the size, of this space 18 between film part 12 and base 4 hereby takes place.

After ending the inward stroke of the pump, the force on nozzle 1 is reduced (FIG. 1D), whereby it will move back to the starting position (FIG. 1A). Valve 12, which connects the space in bellows 2 to the space in nozzle 1, will close first of all here. The film 12 precludes return of the fluid from nozzle 1 to the interior of bellows 2. Space 18 between film and base will also enlarge whereby suck-back is generated, whereby fluid present in spout 52 is drawn back to the interior of nozzle 1. This has considerable advantages in respect of nozzle leakage.

The return movement of nozzle 1 to the starting position creates an underpressure in the larger bellows part 2*b*. This larger bellows part 2*b* will move back to the starting position. Bellows 2 is also the resilient means that will tend to return the pump to the starting, position.

As a result of the underpressure generated in second bellows part 2*b* the valve part 3 will be released, whereby fluid can be drawn into second bellows part 2*b*. Fluid is sucked through the neck 55 of base part 4 in which a suction tube is arranged. The suction tube protrudes into the bottle to which the pump is connected, and is preferably so long that it rests on the bottom of the bottle. The bottle can hereby be pumped sufficiently empty with the pumps according to the invention. The suction tube lies against the undersides of projections 33 in neck 55 of base part 4.

Filling of the second bellows space has the result that an underpressure is created in the bottle. Air present between bellows 2 and base part 4 can hereby flow back into the bottle via valve 54 of closing part 5. Operation of the pump is hereby guaranteed.

With further return movements of nozzle 1 to the starting position the deformation of second bellows part 2*b* will at a given moment be ended (as shown in FIG. 1D). With further movement the support edge 10 between the second, larger bellows part 2*b* and the first, smaller bellows part 2*a* is released from the co-acting part, in particular protrusion 7 of base part 4, whereby the deformation of first bellows part 2*a* will also be reduced. Valve part 3 will hereby move upward and eventually begin to perform its valve function again. The open connection between the large space in bellows 2 of second bellows part 2*b* is closed from the access to neck part 55 of base part 4. Further movement of nozzle 1 has the result that the starting position is finally assumed again.

When nozzle 1 is rotated, thereby assuming the blocked position, nozzle 1 and the rest of the pump are substantially in the starting position, whereby valve 3 blocks the outflow of liquid.

In an embodiment the bellows 2 has a flexible wall of a predetermined shape and thickness which co-acts with a co-acting part 4 which comprises a stiff outer wall along which the flexible wall is movable.

In an embodiment the wall part of bellows 2 has a predetermined diameter variation and/or a predetermined thickness variation so as to cause a desired development of force.

In an embodiment a turned-back edge is arranged on an outer end of the flexible wall for absorbing a pressure force. The turned-back edge provides a stable point of engagement for transmitting the pressure forces in controlled manner from the co-acting part onto the bellows part, and vice versa.

The development of force is preferably substantially constant, increasing, decreasing or a combination thereof.

In another embodiment the development of force is oscillating, whereby a better dispensing can be given.

In an embodiment the flexible wall part is conical.

In an embodiment the flexible wall part of bellows 2 comprises a thickened portion for the purpose of causing a peak in the development of force. The peak indicates that a determined dispensing has been reached.

FIG. 1A-1D show four situations of the pump according to an embodiment of the invention. Shown are nozzle 1, a bellows part 2, a valve part 3, a base part 4 and a closing part 5.

Cross-sections are shown. FIG. 1A shows the starting position of the pump according to the invention. FIG. 1B shows a second step wherein the smaller bellows part 2*a* is compressed by applying force to nozzle 1, wherein valve part 3 continues to block the connection between the larger bellows part 2*b* and the liquid chamber. FIG. 1C shows how the larger bellows part 2*b* deforms, wherein liquid is dispensed via nozzle 1 because valve 12 on the top of bellows 2 allows the liquid to flow to the outside. FIG. 1D shows how the larger bellows part 2*b* once again increases in volume, wherein liquid is drawn out of the liquid container. Air flows simultaneously into the container via -valve 54 arranged on-the top of closing part 5. The deformation of the suck-back chamber 18 between base 8 and film 12 is also indicated close to the large outer end of bellows 2. During this return movement the volume of this chamber 18 increases, whereby suck-back occurs. The starting position as according to FIG. 1A is eventually taken up again, wherein bellows 2 is tensioned on the respective co-acting part of base part 4.

The pump is suitable for liquids, viscous material, foam or gases present in the container, for instance the bottle. The assembly of bellows part 2 and base part 4 results in an appropriate pumping action, wherein valve 3 prevents return flow of liquid to the bottle.

In the shown embodiment the bellows 2 and the co-acting part or unrolling part of base part 4 are point-symmetrical. Bellows 2 has a substantially conical form. The base part or co-acting part 4 optionally has a conical part against which the bellows can unroll. All other forms, such as oval and square, are also possible.

Bellows part 2 is point-symmetrical and comprises a flexible cylindrical wall 5 with a thickness variation which is such that the desired spring characteristic is obtained, wherein a thickened base 24 supports in a recess of nozzle 1, formed for instance by a number of ribs arranged in the nozzle. A thin film or valve 12 co-acts with an outer side of a wall part 16 of nozzle 1 in order to obtain a valve function, so that overpressure is created in chamber 18 of the second, large bellows part. Valve 12 will then be pressed outward and the content will flow outside via nozzle 1 and the spout 52 thereof.

The development of force during compression of bellows 2 and nozzle 1 is a combined action of wall thickness variation of the flexible wall and, optionally, the variation of an outer surface of a co-acting part 4 over which this flexible wall unrolls. Compared to the embodiment shown in FIG. 1A-1D, a protrusion can for instance be arranged on the outer side of the second co-acting part of base part 4, whereby a resistance is generated during unrolling of second bellows part 2*b*, thereby drawing the attention of a user to the fact that a first dispensing has been achieved.

Nozzle 1 can optionally be equipped with a spray orifice. The pump can optionally be provided with a pistol mechanism with a lever coupled via a connection to the bellows. Additional parts can optionally be available for the purpose of venting.

In another embodiment the base part 4 is movable in the direction of bellows 2 instead of vice versa.

Bellows 2 can be provided with diverse variations in the wall thickness. The spring force with which it is moved downward is hereby variable.

The invention claimed is:

1. A system including a diaphragm and co-acting part, comprising:

a co-acting part which comprises a stiff outer wall, a first annular protrusion, and a second annular protrusion, wherein the stiff outer wall comprises a generally radially extending portion of the co-acting part having radial protrusions extending therefrom and including the outermost annular wall; and a diaphragm co-acting therewith which comprises a flexible wall of a predetermined shape and thickness, wherein the flexible wall of the diaphragm is movable along the stiff outer wall of the co-acting part, and wherein the diaphragm comprises at least two separately deformable flexible wall parts, wherein a first deformable flexible wall part is sized and configured to co-act with the first annular protrusion and a second deformable flexible wall part is sized and configured to co-act with the second annular protrusion.

2. The system of claim 1, characterized in that the deformable flexible wall parts of the diaphragm each unroll over the stiff outer wall part of the co-acting part.

3. The system of claim 2, wherein the stiff outer wall part of the co-acting part that co-acts with the deformable wall part of the diaphragm is formed by the radial protrusion.

4. The system of claim 3, characterized in that the deformable wall part of the diaphragm comprises an oblique wall part, wherein the oblique wall part co-acts with the radial protrusion of the co-acting part.

5. The system of claim 4, characterized in that the diaphragm has a substantially conical form.

6. The system of claim 1, further comprising a valve part.

7. The system of claim 6, characterized in that the valve part is accommodated in an opening in the diaphragm and in an opening in the co-acting part, wherein both openings form a flow channel for fluid.

8. The system of claim 7, wherein the valve part comprises a hook which co-acts with a protrusion in the flow channel in the co-acting part.

9. A pump comprising the system of claim 1.

10. A diaphragm for interacting with a co-acting part that has protrusions, the diaphragm comprising a flexible wall of predetermined shape and thickness;

at least two separately deformable flexible wall parts, wherein a first deformable flexible wall part is sized and configured to co-act with a first annular protrusion of co-acting part and a second deformable flexible wall part is sized and configured to co-act with a second annular protrusion of the co-acting part;

substantially vertical parts which unroll during functioning of the diaphragm; and at least two support edges formed by substantially horizontal parts against which the first and second annular protrusions of the co-acting part will support during operation.

* * * * *